(12) United States Patent
Yamada et al.

(10) Patent No.: US 7,787,794 B2
(45) Date of Patent: Aug. 31, 2010

(54) SETTING ANGLE ADJUSTING DEVICE AND SETTING ANGLE ADJUSTING METHOD

(75) Inventors: Kenichi Yamada, Kanagawa (JP); Kazuo Koike, Kanagawa (JP); Tasuku Kohara, Kanagawa (JP); Takashi Inoue, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 659 days.

(21) Appl. No.: 11/660,998

(22) PCT Filed: Jun. 9, 2006

(86) PCT No.: PCT/JP2006/312089

§ 371 (c)(1),
(2), (4) Date: Feb. 23, 2007

(87) PCT Pub. No.: WO2007/004402

PCT Pub. Date: Jan. 11, 2007

(65) Prior Publication Data

US 2008/0089017 A1    Apr. 17, 2008

(30) Foreign Application Priority Data

Jul. 6, 2005   (JP)   ............................. 2005-198034
Feb. 17, 2006  (JP)   ............................. 2006-041526

(51) Int. Cl.
*G03G 15/00* (2006.01)
(52) U.S. Cl. ........................................ 399/81; 399/126
(58) Field of Classification Search .................... 399/81, 399/83, 126, 185, 411, 1, 107
See application file for complete search history.

(56) References Cited

U.S. PATENT DOCUMENTS

| 4,618,870 A | 10/1986 | Inoue |
| 4,639,741 A | 1/1987 | Inoue |
| 4,675,697 A | 6/1987 | Sasaki et al. |
| 4,989,161 A * | 1/1991 | Oaki ........................... 700/261 |
| 6,236,800 B1 * | 5/2001 | Nishima et al. ................ 386/46 |

(Continued)

FOREIGN PATENT DOCUMENTS

JP    63 177623    7/1988

(Continued)

OTHER PUBLICATIONS

Machine translation of Ii (JP 2002-361968), Listed in IDS.*

(Continued)

*Primary Examiner*—David M Gray
*Assistant Examiner*—Rodney Bonnette
(74) *Attorney, Agent, or Firm*—Oblon, Spivak, McClelland, Maier & Neustadt, L.L.P.

(57) ABSTRACT

A setting angle adjusting device, includes a first input part configured to input an instruction for changing a setting angle of an operations panel in a first direction; a second input part configured to input an instruction for changing the setting angle of the operations panel in a second direction different from the first direction; a rotation part configured to change the setting angle of the operations panel; and a driving part configured to rotate the rotation part in a designated direction as corresponding to either the first input part or the second input part.

17 Claims, 16 Drawing Sheets

U.S. PATENT DOCUMENTS

| | | | |
|---|---|---|---|
| 6,532,349 B1 | 3/2003 | Todome | |
| 2003/0218785 A1* | 11/2003 | Sato | 358/501 |
| 2004/0081479 A1 | 4/2004 | Kobayashi et al. | |
| 2004/0114476 A1* | 6/2004 | Shen | 369/30.36 |
| 2004/0141431 A1* | 7/2004 | Mizushima et al. | 369/30.26 |

FOREIGN PATENT DOCUMENTS

| | | |
|---|---|---|
| JP | 2 40189 | 2/1990 |
| JP | 11 41553 | 2/1999 |
| JP | 11 117471 | 4/1999 |
| JP | 11-119498 | 4/1999 |
| JP | 2001-277910 | 10/2001 |
| JP | 2003 337506 | 11/2003 |
| JP | 2003 345087 | 12/2003 |
| JP | 2004 220727 | 8/2004 |
| JP | 2004 294700 | 10/2004 |

OTHER PUBLICATIONS

Machine translation of Miura et al. (JP 2003-337506), Listed in IDS.*

Machine translation of Tabata et al. (JP 2004-294700), Listed in IDS.*

Machine translation of Ikemizu et al. (JP 11-117471), Listed in IDS.*

* cited by examiner

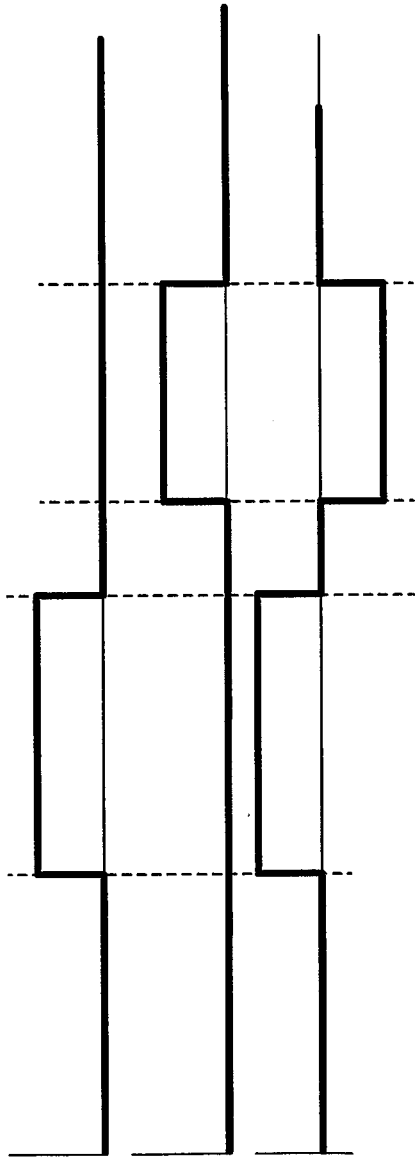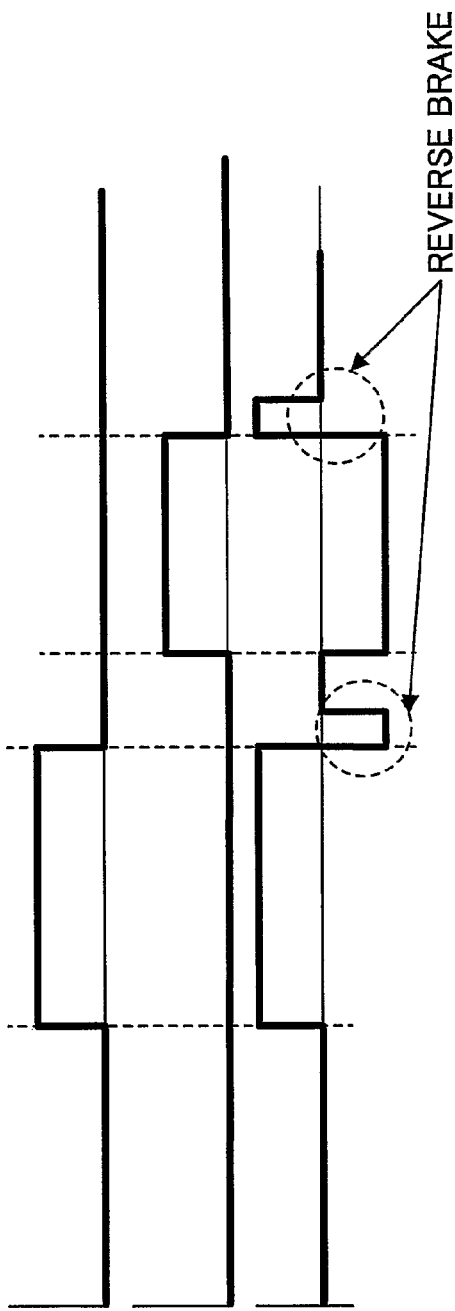

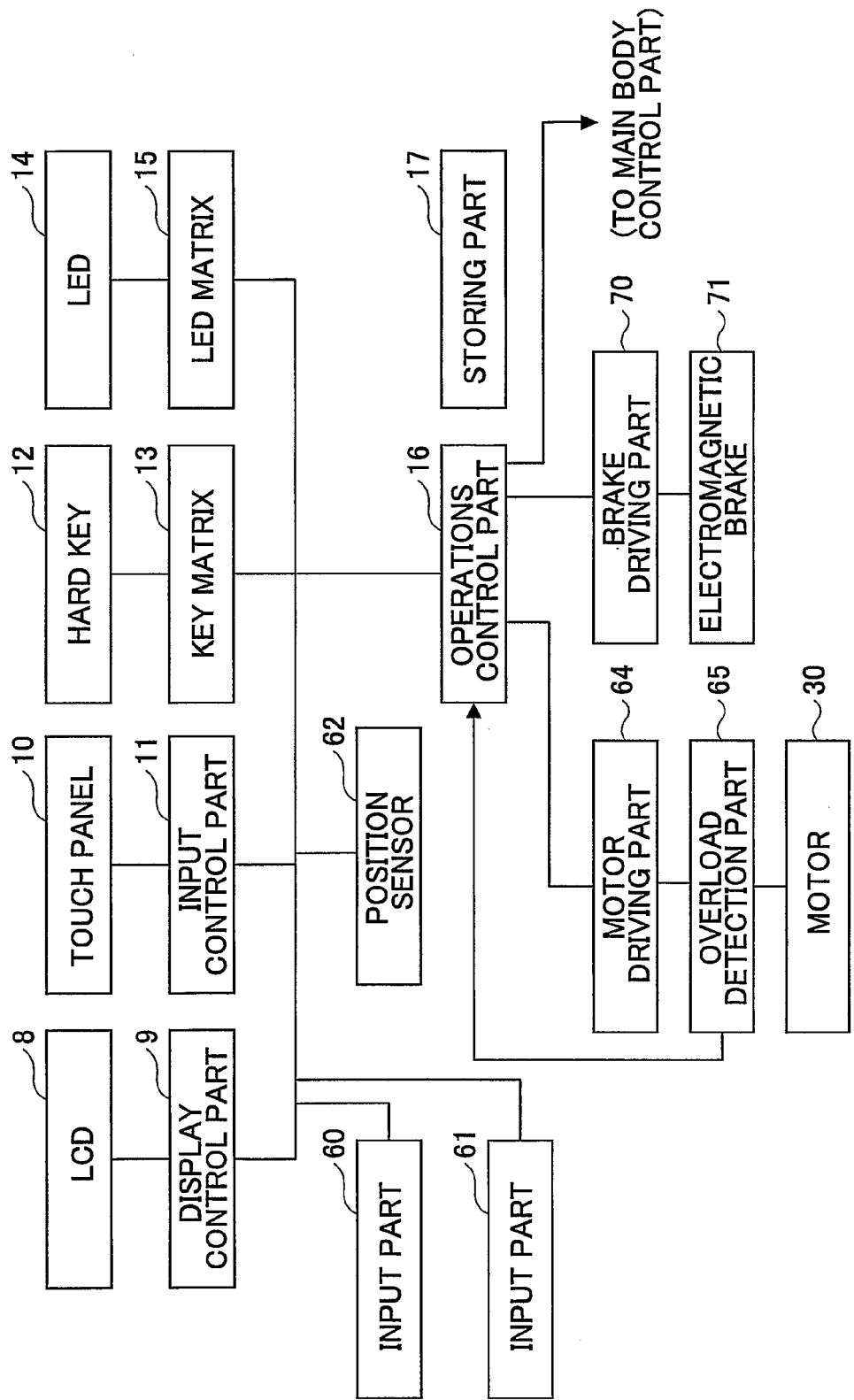

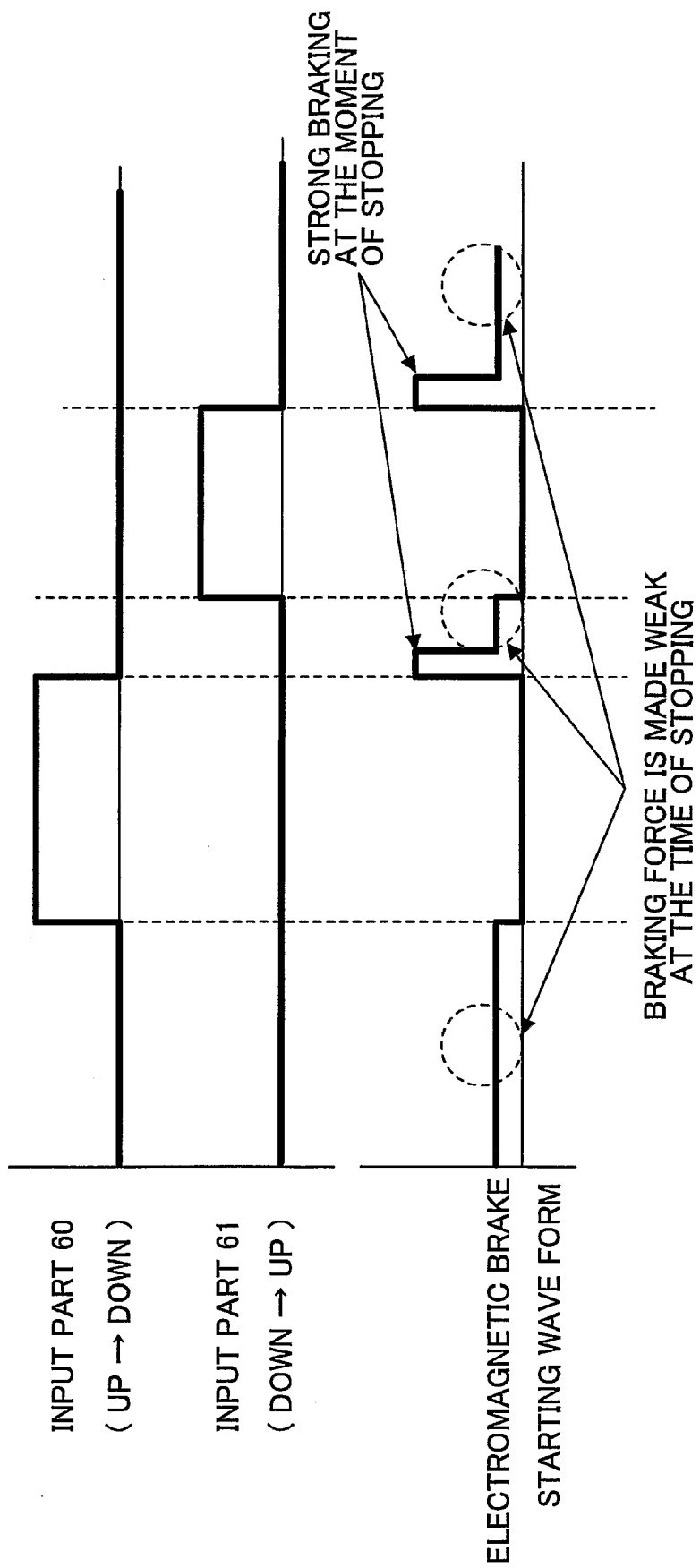

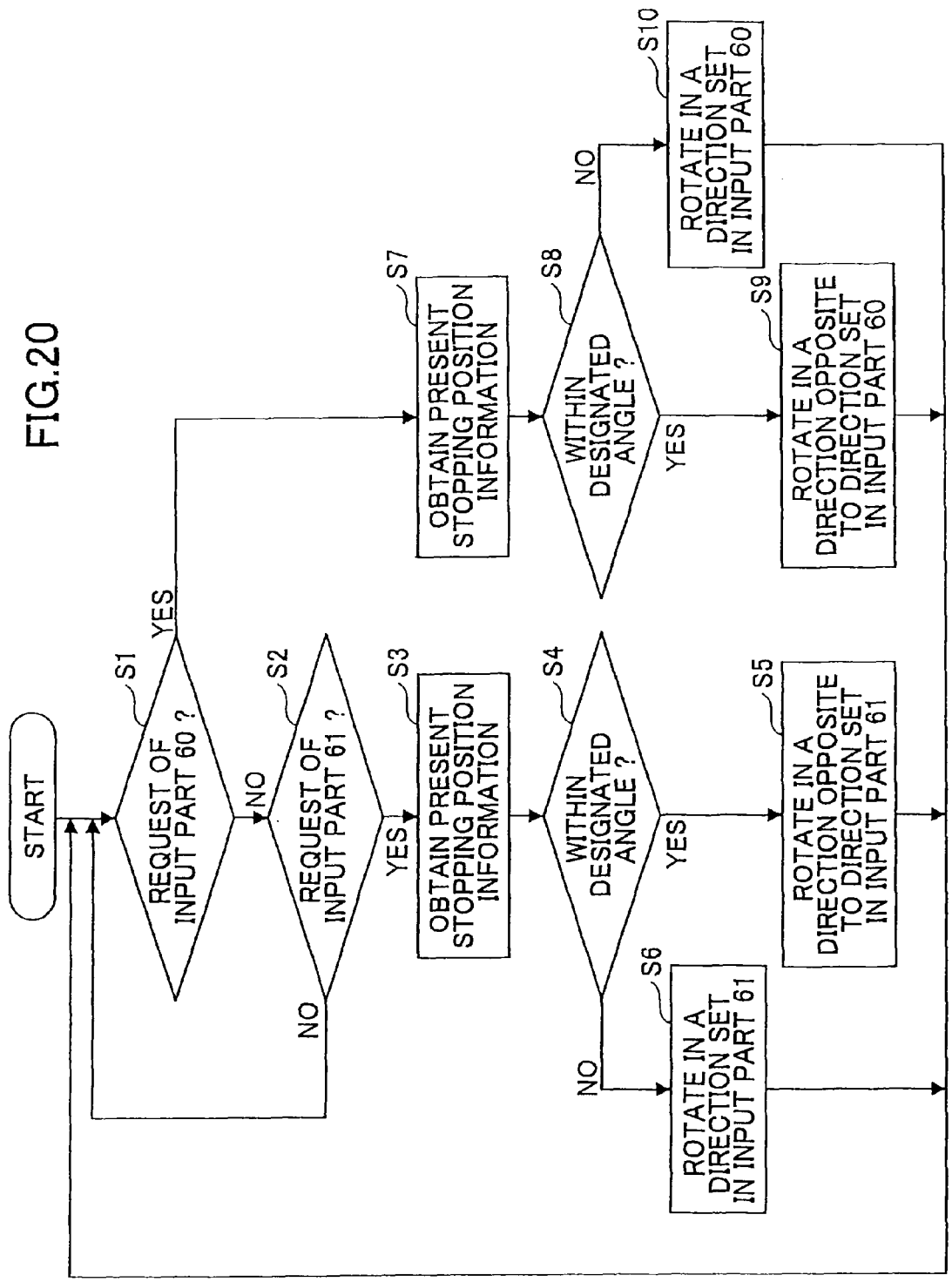

SETTING ANGLE ADJUSTING DEVICE AND SETTING ANGLE ADJUSTING METHOD

TECHNICAL FIELD

The present invention generally relates to setting angle adjusting devices and setting angle adjusting methods, and more specifically, to a setting angle adjusting device and setting angle adjusting method whereby a setting angle of an operations panel is changed.

BACKGROUND ART

An operations part (for example, an operations panel) of a conventional image forming device is frequently fixed to an exterior part of a main body of the image forming device in a state where the operations part is inclined at a designated angle, taking into consideration the position of a visual line of sight of an operator at the time of operation or ease of the operation. Here, the image forming device is, for example, an electrophotographic type copier, a facsimile, a printer, a plotter, a printing device, or the like.

However, there is a problem in that room light is reflected in a display part (such as a liquid crystal panel displaying information) provided at the above-mentioned-fixed operations part so that visibility of the display part is decreased.

In addition, while inroads into society by wheelchair users have progressed recently, the operations part of the image forming device is usually provided at an upper surface of the device. Accordingly, a setting position of the operations part is too high for the wheelchair user so that the wheel chair user cannot operate the operations part.

Because of this, an image forming device wherein a setting angle of a display or the like can be changed is suggested. See Japanese Laid-Open Patent Application Publication No. 2003-345087 and Japanese Laid-Open Patent Application Publication No. 2003-337506. In this image forming device, the setting angle is changed by a part for applying a load by friction to a member such as a shaft for loading so that stopping and remaining at a designated tilt position is achieved or by a part for locking such as a ratchet mechanism.

However, if the locking force is large, an operating force for tilt operations must also be large. On the other hand, if the locking force is small, the operations part can be rotated when a button is operated. In addition, if a mechanism for opening the ratchet mechanism is added, two operations for the tilt operation are required. Furthermore, it is an extremely big problem for the wheelchair user, a child, or an aged person to be required to perform a complex operation such as applying the large operating force or adjusting the rotational angle while the ratchet mechanism is engaged.

The position of a switch for rotating the operations panel is also a problem. For example, in a case where the switch is situated at the same surface as the operations panel, if the operations panel is perpendicular to the ground, the operation of the switch may be easily implemented. However, if the operations panel is substantially horizontal (parallel) with the ground, the operation of the switch may be difficult for the wheelchair user or the child. Therefore, not only the mechanism for changing the setting angle of the operations panel but also an arrangement of the switch for rotation of the operations panel may be an important problem.

DISCLOSURE OF THE INVENTION

Accordingly, in a preferred embodiment of the present invention there is provided a novel and useful setting angle adjusting device and setting angle adjusting method solving one or more of the problems discussed above.

According to one aspect of the present invention there is provided a setting angle adjusting device and setting angle adjusting method whereby a setting angle of an operations part can be easily rotated to a specific angle, the angle being desirable for an operator, by plural input parts so that operability can be improved.

An embodiment of the present invention is achieved by a setting angle adjusting device, including: a first input part configured to input an instruction for changing a setting angle of an operations panel in a first direction; a second input part configured to input an instruction for changing the setting angle of the operations panel in a second direction different from the first direction; a rotation part configured to change the setting angle of the operations panel; and a driving part configured to rotate the rotation part in a designated direction as corresponding to either the first input part or the second input part.

An embodiment of the present invention is also achieved by a setting angle adjusting device, including: a first input part configured to input an instruction for changing a setting angle of an operations panel in a first direction; a second input part configured to input an instruction for changing the setting angle of the operations panel in a second direction different from the first direction; a rotation part configured to change the setting angle of the operations panel; a driving part configured to rotate the rotation part in a designated direction; and a setting angle detection part configured to detect a plurality of operations panel stopping positions; wherein the driving part drives the rotation part in the direction corresponding to either the first or the second input part based on operation of either the first input part or the second input part, respectively, so that the driving part is stopped at a stopping position detected by the setting angle detection part.

An embodiment of the present invention is also achieved by a setting angle adjusting method, including: a first input step of inputting an instruction that a setting angle of an operations panel is changed in a first direction; a second input step of inputting an instruction that the setting angle is changed to a second direction different from the first direction; a rotation step of changing the setting angle of the operations panel; and a driving step of rotating the rotation part in a designated direction corresponding to one of the first input step and the second input step.

An embodiment of the present invention is also achieved by a setting angle adjusting method, including: a first input step of inputting an instruction that a setting angle of an operations panel is changed in a first direction; a second input step of inputting an instruction that the setting angle is changed to a second direction different from the first direction; a rotation step of changing the setting angle of the operations panel; a driving step of rotating the rotation part in a designated direction; and a setting angle detection step of detecting plural operation panel stopping positions; wherein the rotation part is driven in a direction corresponding to either the first or second input process based on operation of either the first input process or the second input process, respectively, so that the driving process is stopped at a stopping position detected in the detection process.

According to the embodiment of the present invention, the setting-angle of the operations part can be easily rotated to the specific desirable angle for the operator by plural input parts so that the operability can be improved.

Other objects, features, and advantages of the present invention will become more apparent from the following detailed description when read in conjunction with the accompanying drawings.

BRIEF DESCRIPTION OF THE DRAWINGS

FIG. 9 is a timing chart of a control signal of the embodiment of the present invention;

FIG. 10 is a timing chart of a control signal when a reverse brake is applied to a motor of the embodiment of the present invention;

FIG. 11 is a control block diagram of the operations part when the electromagnetic brake of the embodiment of the present invention is used;

FIG. 12 is a timing chart showing a brake application waveform when an electric motor is stopped by using the electromagnetic brake of the embodiment of the present invention;

FIG. 20 is a flow chart showing operations of the setting angle adjusting device of the embodiment of the present invention.

BEST MODE FOR CARRYING OUT THE INVENTION

A description of the present invention is now given, with reference to FIG. 1 through FIG. 20, including embodiments of the present invention.

Figure 1:
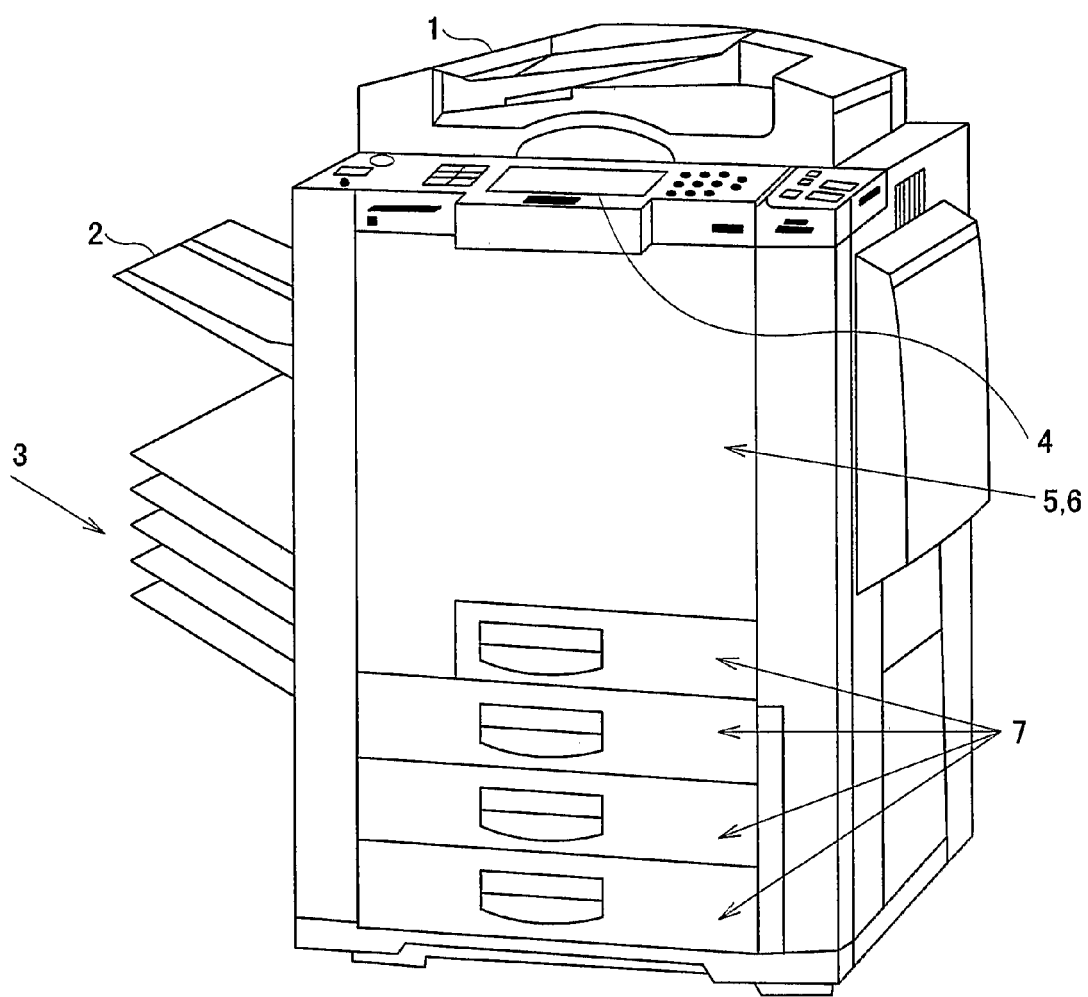
FIG. 1 is a perspective view of an image processing device related to an embodiment of the present invention.

FIG. 1 is a perspective view of an image processing device related to an embodiment of the present invention. As shown in FIG. 1, an image processing device main body includes an ADF 1, a scanner 5, a printer 6, a paper tray 7, an operations part (operations panel) 4, a paper discharge tray 2, and a sorter 3. The ADF 1 is situated in an upper part of the image processing device main body and sends a subject copy to the scanner 5. The scanner 5 reads out the subject copy. The printer 6, installed inside of the main body and therefore not shown in FIG. 1, outputs a copied image. The sorter 3 receives copied papers.

Figure 2:
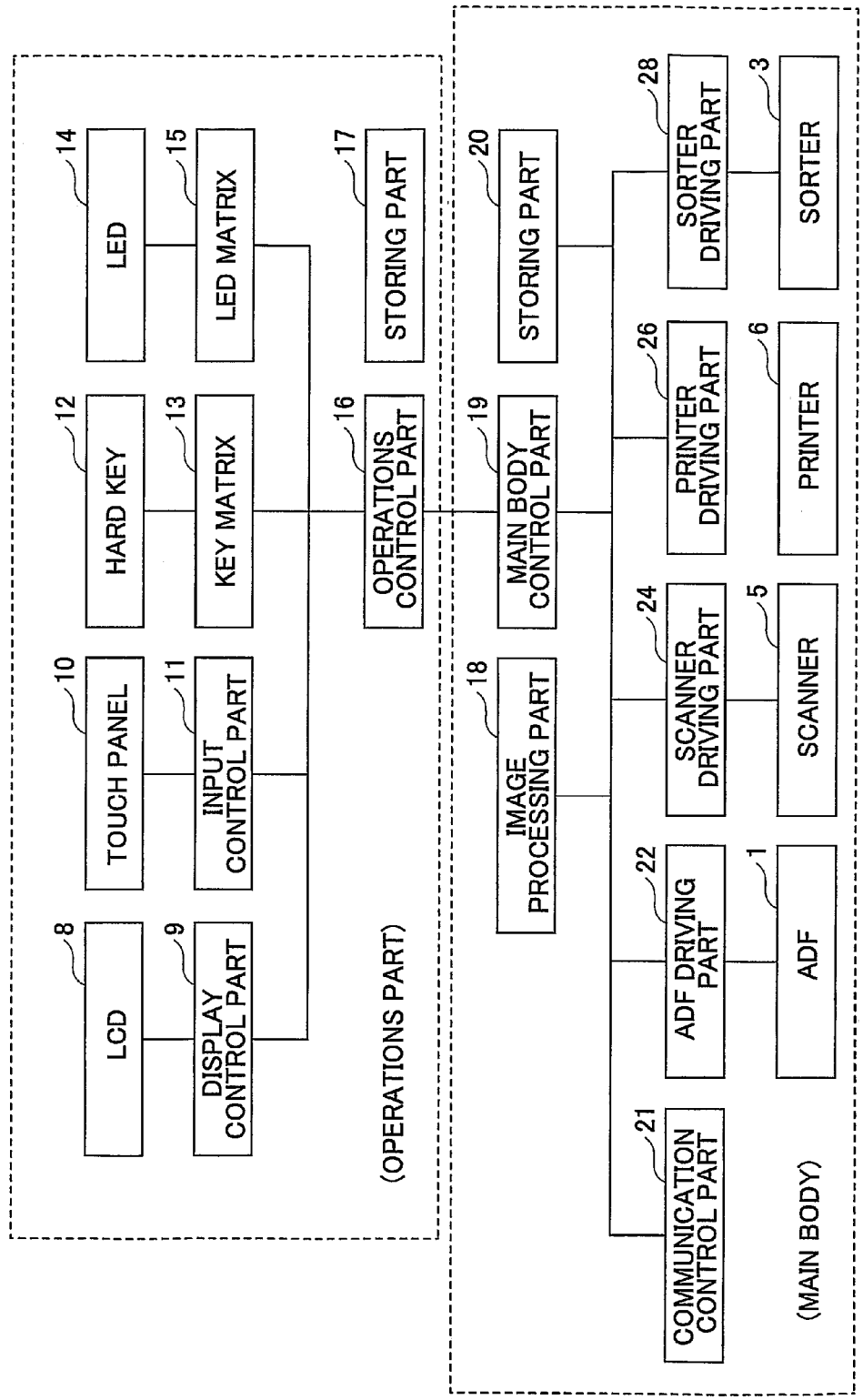
FIG. 2 is a block diagram of a control part of the image processing device related to the embodiment of the present invention.

FIG. 2 is a block diagram of a control part of the image processing device related to the embodiment of the present invention. A control block of the operations part 4 is shown in the upper part of FIG. 2 and a control block of the image processing device main body is shown in the lower part.

The operations part 4 includes an LCD 8, a display controller 9, a touch panel 10, an input control part 11, a hard key 12, a key matrix 13, an LED 14, an LED matrix 15, an operation control part 16, and a storage part 17. Operating buttons for implementing various inputs are formed by a hard switch (hard key) and a soft key using the touch panel 10. A display device such as an LED and a display such as an LCD are used for displaying an operating state or instruction from a machine. The operations control part 16 controls each of the above-mentioned control parts, communicates with the storage part 17 or a main body control part 19 and transfers and receives input information and display data. The image processing device main body includes an image processing part 18, the main body control part 19, a storage part 20, a communication control part 21, an ADF driving part 22, the ADF 1, a scanner driving part 24, the scanner 5, a printer driving part 26, the printer 6, a sorter driving part 28, and the sorter 3.

The storage part 20 stores a program for sequence control implemented by the main body control part 19 and a file for interpreting an input signal from the operations part 4. Although not shown in FIG. 2, an image processing part for implementing image processing, such as a UCR, contour emphasis, scaling up and down, of image data read by the scanner or the like and a communication control part for image communications using a LAN or FAX may be included in the image processing device main body.

Figure 3:
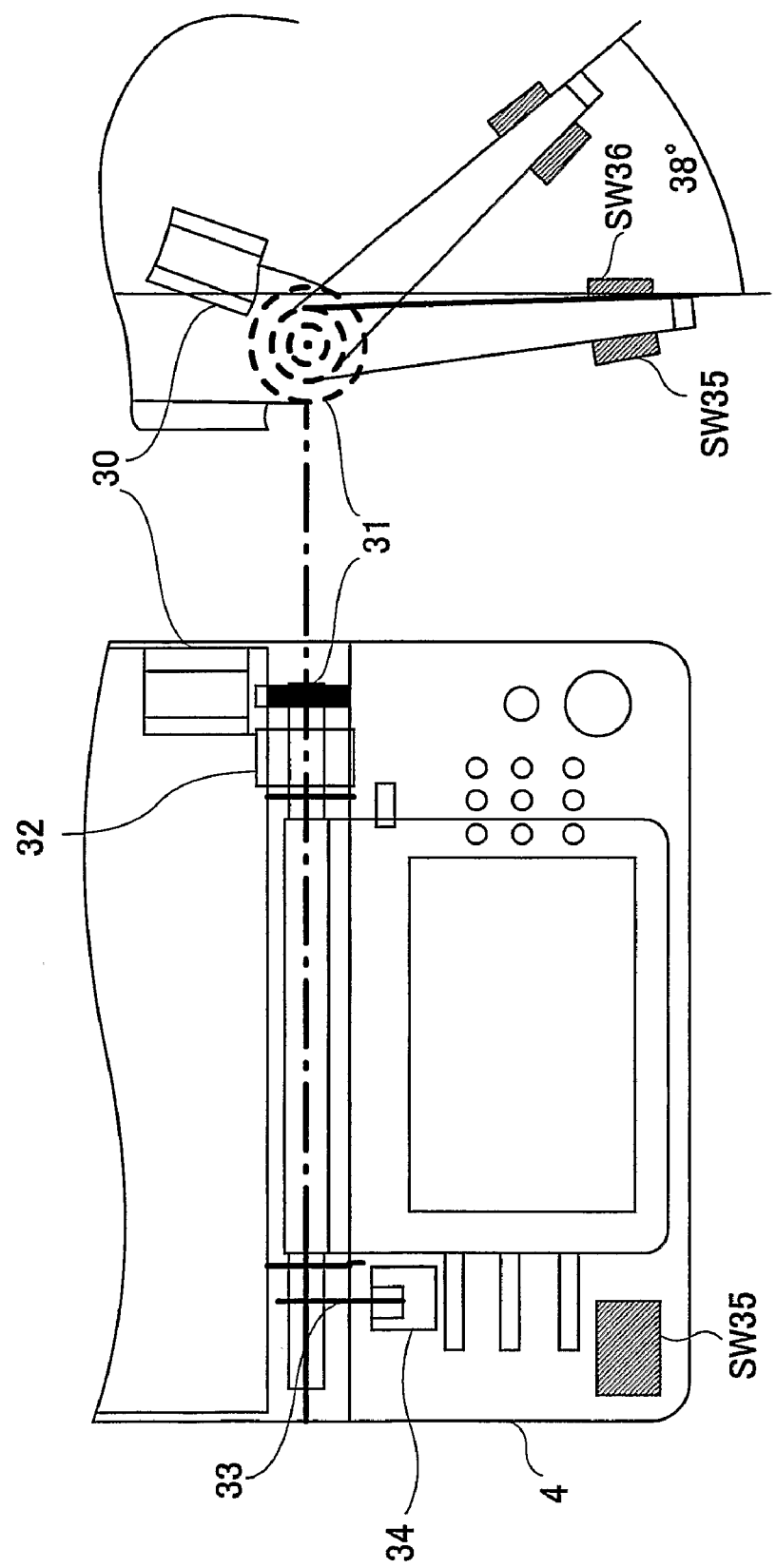
FIG. 3 is a schematic view of an operations part of the embodiment of the present invention.
Figure 4:
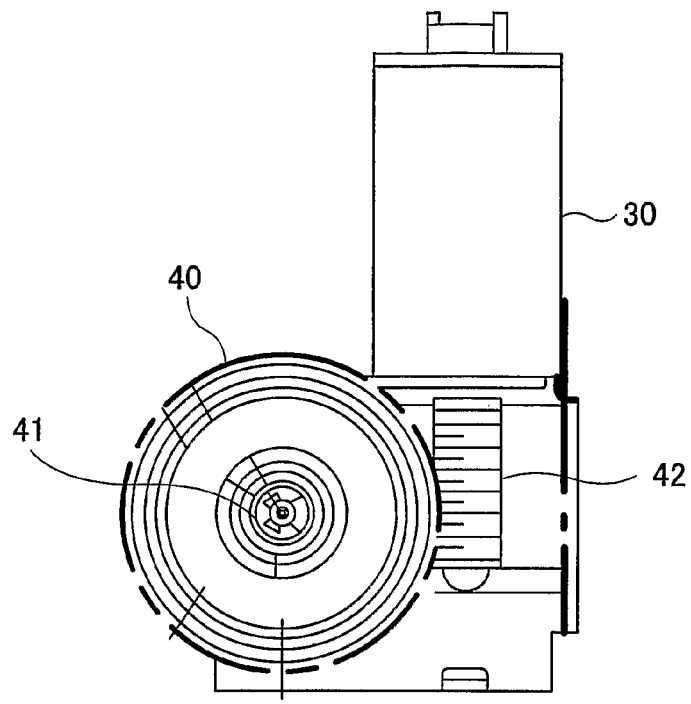
FIG. 4 is a side surface view of a speed reducing mechanism of the embodiment of the present invention.

FIG. 3 is a schematic view of the operations part 4 according to the embodiment of the present invention. The left part of FIG. 3 is a front view of the operations part 4 and a right part of FIG. 3 is a right side view of the operations part 4. FIG. 4 is a side surface view of a speed reducing mechanism of the embodiment of the present invention.

A switch input part (tilt SW 35 and tilt SW 36) for pushing in a direction where the operations part (operations panel) 4 is to be rotated as an input part, a rotational shaft 41 (See FIG. 4) as a rotational part, a motor 30 as a driving part, a speed reducing mechanism 31, a latch mechanism 32, a position detection plate 33 as a setting angle detection part, and a photo interrupter 34 are provided.

When the operations part 4 is expected to be tilted downward by the operator, the tilt SW 35 provided on the upper surface, namely a surface side, of the operations part is pushed downward and thereby this is detected as an operating instruction for rotation downward so that a detection signal is generated.

On the other hand, when the operations part 4 is expected to be tilted upward by the operator, the tilt SW 36 provided on a lower surface, namely a rear side, of the operations part 4 is pushed upward and thereby this is detected as an operating instruction in the reverse direction (direction reverse to the direction when the tilt SW 35 is pushed), namely upward so that a signal for instructing rotation in the reverse direction is generated. The motor 30 is rotated by using the signal so that the operation for rotation in the direction which the operator intends is implemented.

According to the above-mentioned embodiment of the present invention, the operator can cause downward movement and upward movement of the operations part 4 under the same sensing. In addition, it is possible to make the operations part 4 stop at an intended position and therefore positioning precision of the operations part 4 can be improved.

The rotational shaft 41 of the operations part 4 is connected to the motor 30 via the speed reducing mechanism 31. Because of this, a force for maintaining an angle of the operations part 4 is maintained by the speed reducing mechanism 31. If the motor 30 is not driven, the operator cannot easily rotate the operations part 4 even if the operator pushes the operations part 4. If a latch mechanism 32 is added between the speed reducing mechanism 31 and the rotational shaft 41 of the operations part 4, the latch is opened when the motor is driven, and the rotational shaft 41 is held by the latch when the motor 30 is stopped, so that it is possible to securely hold the rotational shaft 41.

In addition, when the gear 40 is used as the speed reducing mechanism 31, backlash of the gear 40 may be generated. However, such backlash generated when using the operations panel 4 can be prevented by using the above-discussed latch mechanism 32.

Figure 6:
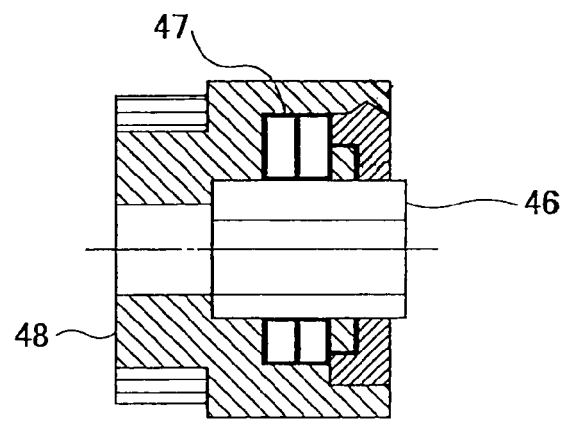
FIG. 6 is a cross-sectional view of a torque hinge of the embodiment of the present invention.

For example, a torque hinge shown in FIG. 6 may be used as the latch mechanism 32. A bearing 46 and the rotational shaft 41 are fixed and a plate spring 47 is fixed to a housing 48, so that a holding force due to a friction force is generated between the rotational shaft 41 and the housing 48 by the plate spring 47.

Figure 8:
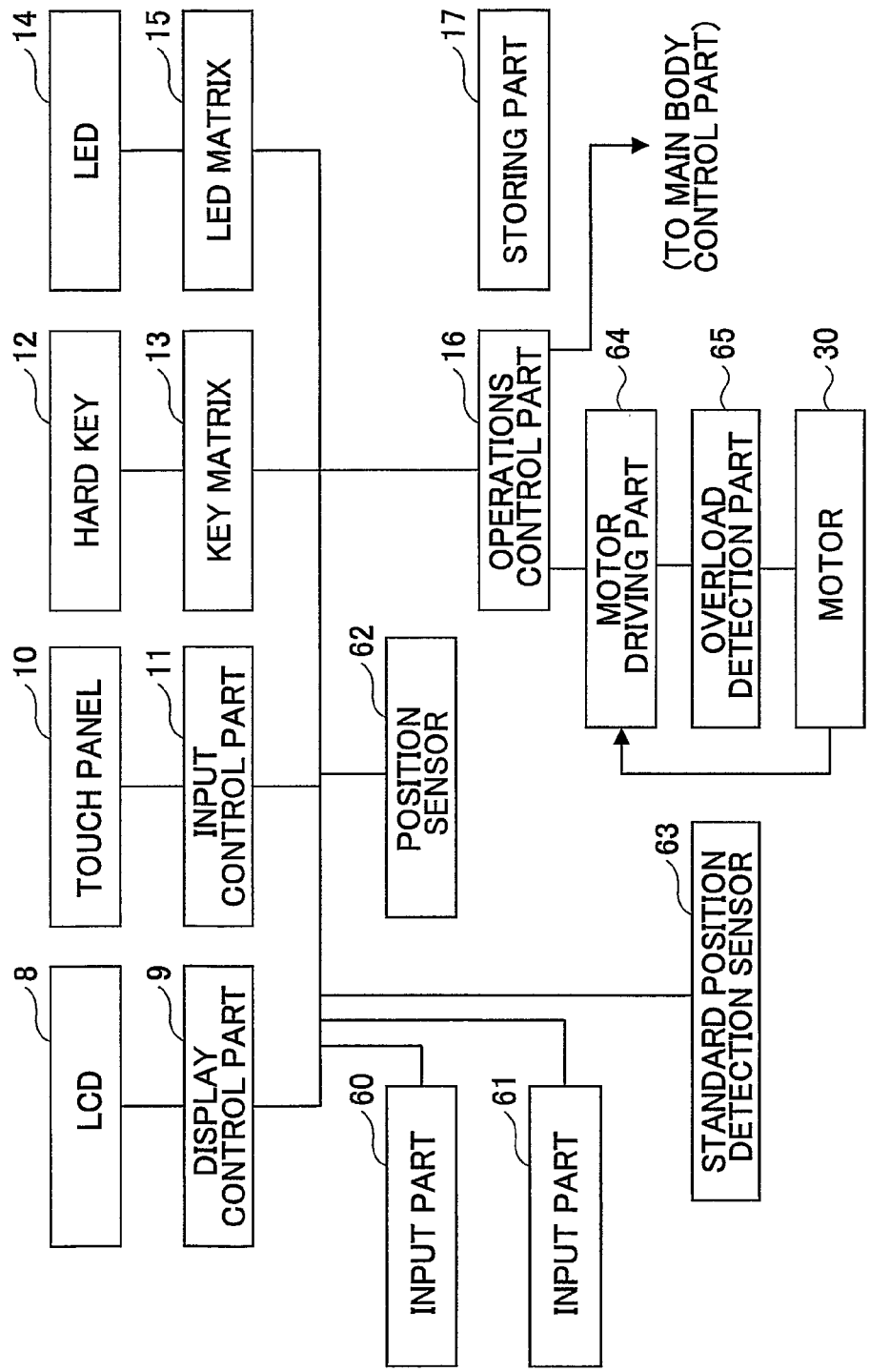
FIG. 8 is a control block view of a setting angle adjusting device of the embodiment of the present invention.

FIG. 8 is a control block view of a setting angle adjusting device of the embodiment of the present invention. The angle adjusting device, as well as the operations part 4 shown in FIG. 2, includes the LCD 8, the display control part 9, the touch panel 10, the input control part 11, the hard key 12, the key matrix 13, the LED 14, the LED matrix 15, the operations control part 16, and the storage part 17. In addition, the angle adjusting device includes an input part 60 (the tilt SW 35 shown in FIG. 3), an input part 61 (the tilt SW 36 shown in FIG. 3), a position sensor 62, a standard position detection sensor 63 as a standard position determination part, a motor driving part 64, an overload detection part 65, and the motor 30. When inputs of the input parts 60 and 61 are detected, the operations control part 16 determines whether the output is from the input part 60 or 61 and outputs a motor driving signal and an instruction signal in the rotational direction of the motor 30 to the motor driving part 64. A form of the output signal is shown in FIG. 9.

Next, a stopping part of the embodiment of the present invention is discussed. As discussed above, the rotational shaft 41 of the operations part 4 is connected to the motor 30 via the speed reducing mechanism 31.

Here, inertia of the motor 30 and the speed reducing mechanism 31 may become large so that the rotation of the operations panel 4 may not immediately stop even if the pushing is stopped. In this case, the operations panel 4 may be rotated too much. Therefore, if the stopping part such as a brake is applied to the rotational mechanism when the pushing is stopped, it is possible to immediately stop the rotational mechanism. As such a brake, an electromagnetic brake or a reverse rotational brake which applies a reverse phase voltage to the motor 30 may be used.

FIG. 10 is a timing chart of a control signal when a reverse brake is applied to the motor 30 of the embodiment of the present invention. The brake can be applied by shorting between motor terminals. Even if the motor terminals are shorted at the brake timing shown in FIG. 10, the same effect can be achieved.

Figure 7:
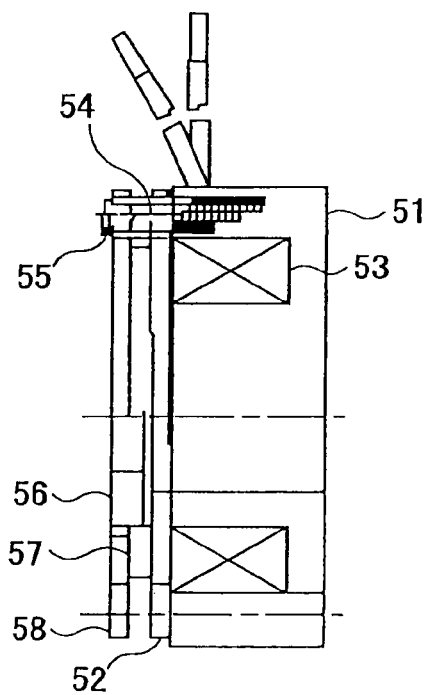
FIG. 7 is a schematic view of an electromagnetic brake of the embodiment of the present invention.

FIG. 7 is a schematic view of an electromagnetic brake of the embodiment of the present invention. The electromagnetic brake includes a yoke 51, an armature 52, a coil 53, a pin spring 54, a pole 55, a hub 56, a disk 57 and a plate 58. The yoke 51 and the armature 52 form a magnetic circuit. The coil 53 is provided inside of the yoke 51. When the coil 53 is energized, in the formed magnetic circuit, a brake is applied by a friction force whereby the armature 52 is attracted to and held by the yoke 51 with the magnetic force. Here, the yoke 51 is fixed to the main body and the armature 52 is fixed to the rotation shaft, so the friction brake can be applied when the coil 53 is energized. When the coil 31 is not energized, the armature 52 united with the rotation shaft is capable of being freely rotated.

FIG. 11 is a control block diagram of the operations part 4 when the electromagnetic brake of the embodiment of the present invention is used. FIG. 12 is a timing chart showing a brake application waveform when the electric motor 30 is stopped by using the electromagnetic brake of the embodiment of the present invention.

The operations part 4, as well as the setting angle adjusting device shown in FIG. 8, includes the LCD 8, the display control part 9, the touch panel 10, the input control part 11, the hard key 12, the key matrix 13, the LED 14, the LED matrix 15, the operations control part 16, the storage part 17, the input part 60, the input part 61, the position sensor 62, the motor driving part 64, the overload detection part 65, the motor 30, an electromagnetic brake 71, and a brake driving part 70 driving the electromagnetic brake 71. The brake driving part 70 is controlled by the operations control part 16.

Driving of the brake is started just after the motor 30 is stopped and stopped just before the motor 30 is driven. At this time, rated energizing power is applied during a constant time period just after the motor 30 is stopped. If the time period is short, energizing power more than the rated energizing power can be applied. The energizing power is controlled so that the energizing power to the brake is reduced after the constant time. When the armature 52 is attracted by the yoke 51, the air gap between the armature 52 and the yoke 51 is made small so that the magnetic resistance is decreased. As a result of this, the attraction force is made large, and sufficient friction force can be obtained even if the rated energizing power is applied. As a result of this, the consumption of electric power is reduced and it is necessary for the heat from the electromagnetic brake to be avoided. For example, the electromagnetic brake can be replaced with the torque hinge or used with the torque hinge. A driving method of the electromagnetic brake in this case is the same as the timing chart shown in FIG. 12.

There may not be optional positions but rather several levels of stopping angles of the operations part 4. Corresponding to this, the stopping position mark fixed on the rotation shaft of the operations part 4 is read out by the position sensor 62 so that the operations part 4 is stopped.

Figure 5:
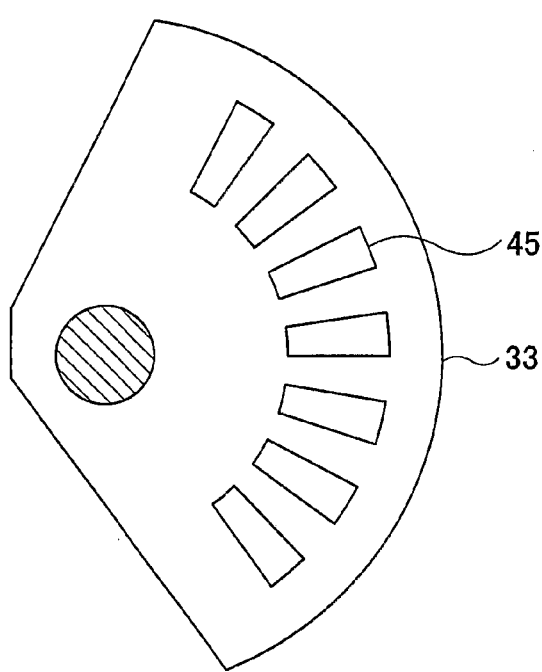
FIG. 5 is a schematic view of a position detection plate of the embodiment of the present invention.

As shown in FIG. 3, a circular arc-shaped position detection plate 33 is provided at the rotation shaft 41 supporting the operations panel 4. As shown in FIG. 5, slits (opening parts) 45 having substantially rectangular shapes are formed at intervals along the circumference of the position detection plate 33. These intervals may be constant or different as necessary. This position detection plate 33 is fixed to the rotation shaft 41 and rotated as accompanying with the rotation of the rotation shaft 41.

As shown in FIG. 3, a photo interrupter 34 having a side surface in the shape of a rectangle with a notch in one side is provided such that the position of the detection plate 33 is clamped by the photo interrupter 34.

The slits 45 are detected by the position detection plate 33 by a light emitting part and a light receiving part (not shown) of the photo interrupter 34.

Figure 13:
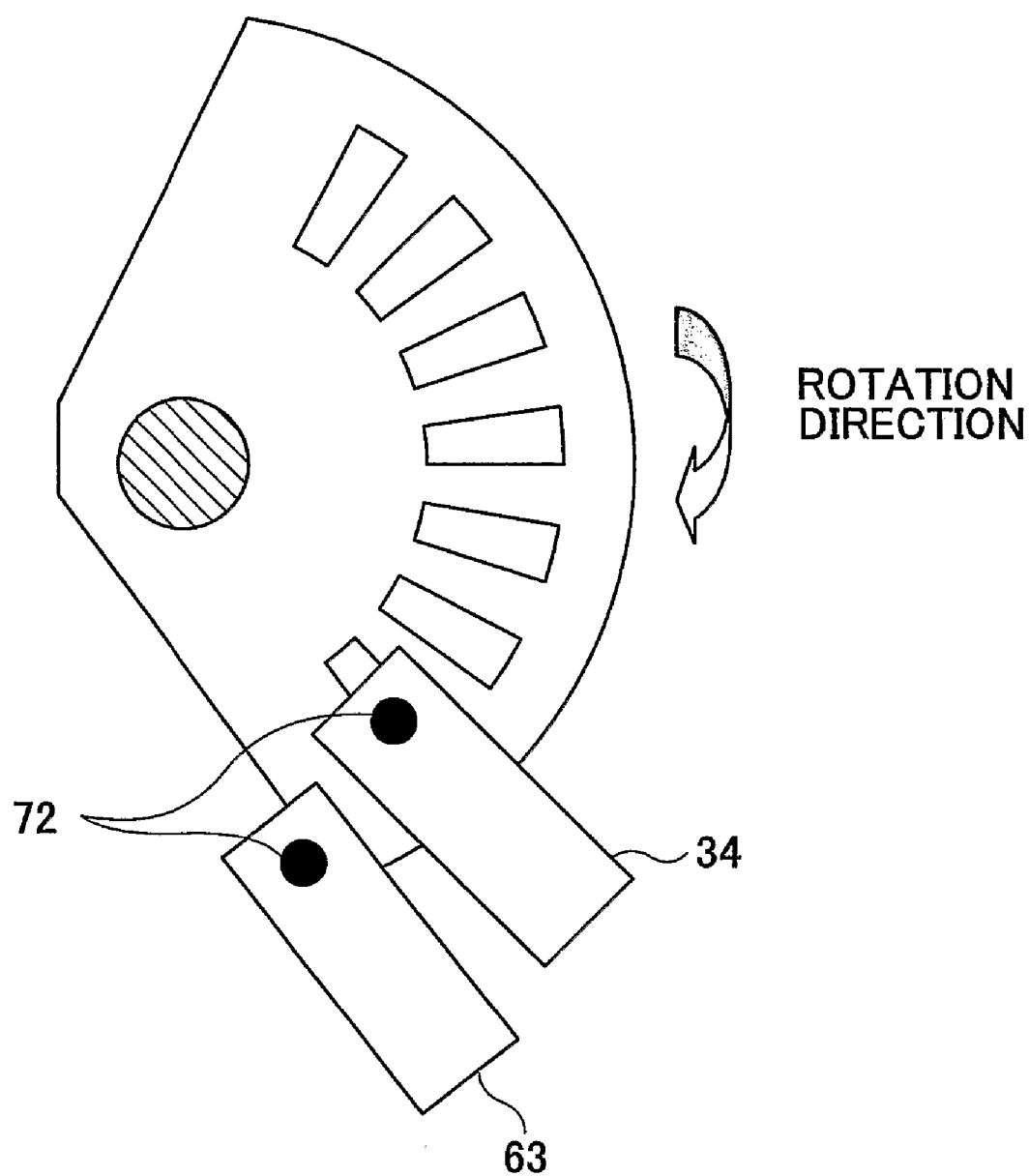
FIG. 13 is a schematic view showing a positional relationship of a position detection plate and a photo-interrupter.
Figure 14:
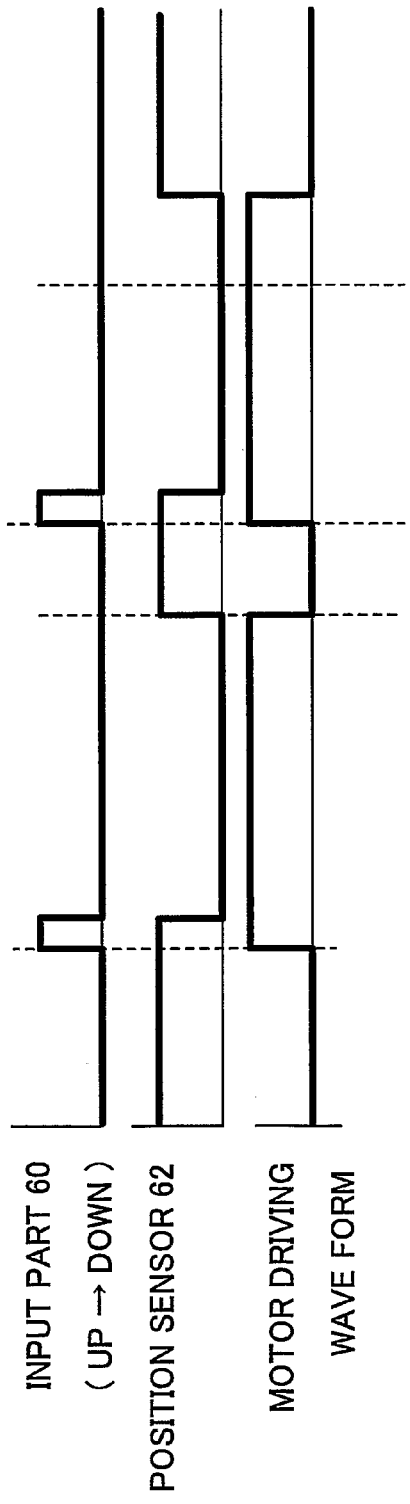
FIG. 14 is a timing chart of a control signal of the embodiment of the present invention.

Therefore, the slits 45 of the position detection plate 33 are detected and counted from a designated position by the photo interrupter 34 so that the oscillating angle of the operation panel 4 can be detected. Such a positional relationship between the position detection plate 33 and the photo interrupter 34 is shown in FIG. 13. The detection position of the photo interrupter 34 corresponds to the slit opening part of the position detection plate 33. The opening parts are detected in due order as accompanying the rotation and the tilt angle is detected. FIG. 13 shows the operations panel 4 in an almost horizontal position (the initial position where the operations panel 4 is rotated most upward). When the tilt operation is performed, the operations panel 4 is rotated in the direction shown in FIG. 13. The rotation position can be determined by counting the number of slits detected from the initial position. In addition, as shown in FIG. 13, the rotation position can be positively determined by providing the standard position detection sensor 63. The timing of control signals in this case is shown in FIG. 14.

The detector of the standard position detection sensor 63 is provided such that the slit position of the position detection plate 33 is avoided, so that when the initial position is situated far in the reverse direction of the rotation direction, such a position is detected. By adding a similar sensor to a maximum inclination position of the position detection plate, it is possible to prevent the position being situated far in the reverse direction of the rotation direction. Although not shown in the control block diagram, when the photo sensor is used and the sensor amplifier is required, an amplifier circuit for receiving the output of the sensor may be provided and the output of the amplified circuit may be added to the operations control part.

There is no need to repeat the operation every time a single sensor position is detected as discussed above. In addition, it is possible to perform a one-touch moving operation on a position designated in advance. Furthermore, it is possible to skip a slit 45 by a simple operation regardless of the detection of the position sensor.

Figure 15:
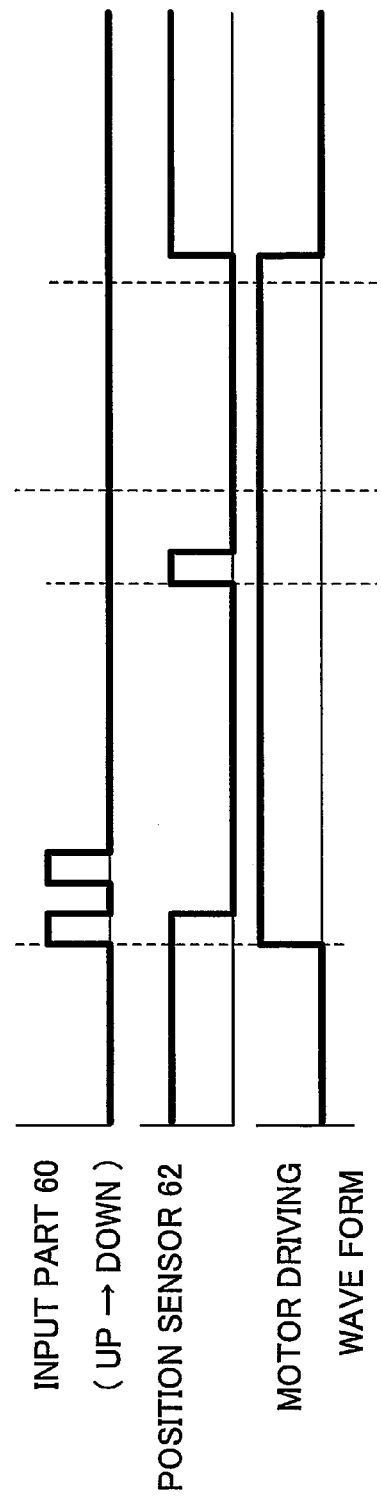
FIG. 15 is a timing chart of an input signal and driving and stopping of the electric motor when plural position sensors are skipped in the embodiment of the present invention.

FIG. 15 is a timing chart of an input signal and driving and stopping of the electric motor 30 when plural position sensors are skipped in the embodiment of the present invention. When plural slits 45 are expected to be skipped at a sensor position when the tilt angle is changed, the input switches are continuously pushed at the slit 45 number and the number is determined and stored by the operations control part 16. The operations control part 16 drives the motor 30 in a designated direction when the pushing of the switch is detected, monitors an input from the position sensor, and determines the input slit 45 number. The motor driving is continued until the input slit 45 number is consistent with the number of times the switch is pushed and is stopped when the input slit 45 number is consistent with the number of times the switch is pushed.

Figure 16:
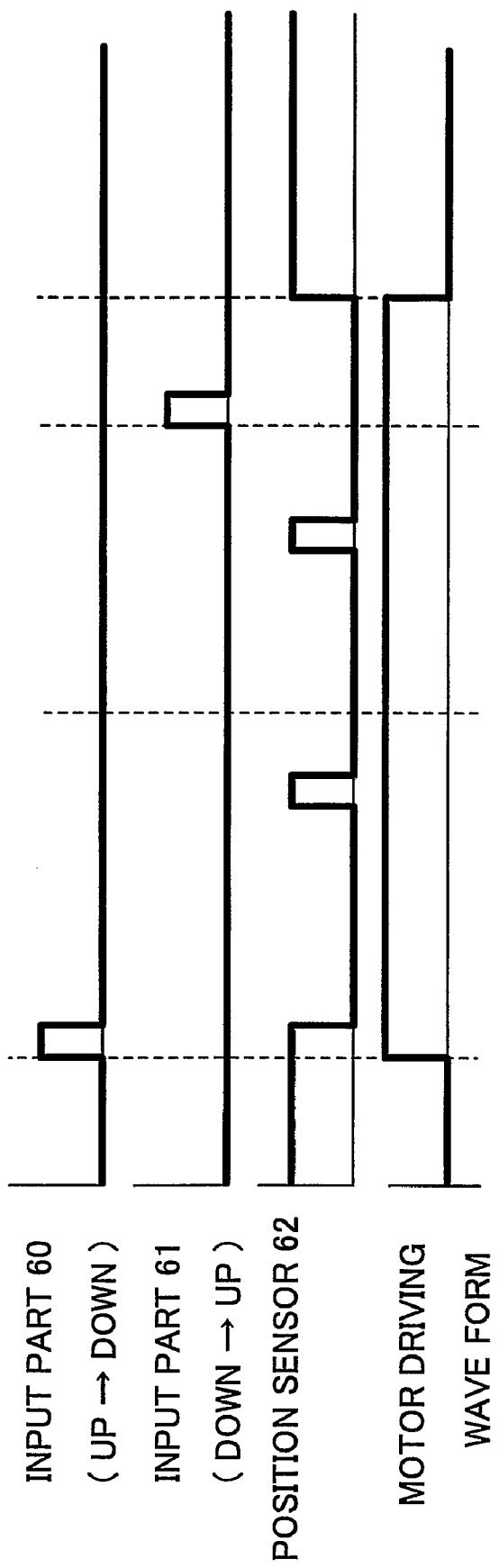
FIG. 16 is a timing chart of motor driving when a continuous tilt operation is performed by a one-touch method at the time of changing the operations part of the embodiment of the present invention.

FIG. 16 is a timing chart of motor driving when a continuous tilt operation is performed by one-touch at the time of rotating the operations part 4 according to the embodiment of the present invention. According to the embodiment of the present invention, an input in either direction is made by pushing at the time of starting, the rotation operation is continued without moving the hands, and the input part is pushed again at a target stop position so that the rotation can be stopped. Here, the tilt operation is started by pushing the input part 60. The motor driving is stopped by pushing the input part 61 at the desirable angle. The timing of motor stopping is a first position sensor output time after the input part 62 is pushed. While the input part 61 is used for the stopping operation, the input part 60 may be re-pushed and another input part such as a STOP switch provided in such a device may be used. A function setting of the input part of the tilt operation may be stored in the storage part in advance and the operations control part 16 may read it out for controlling.

Figure 17:
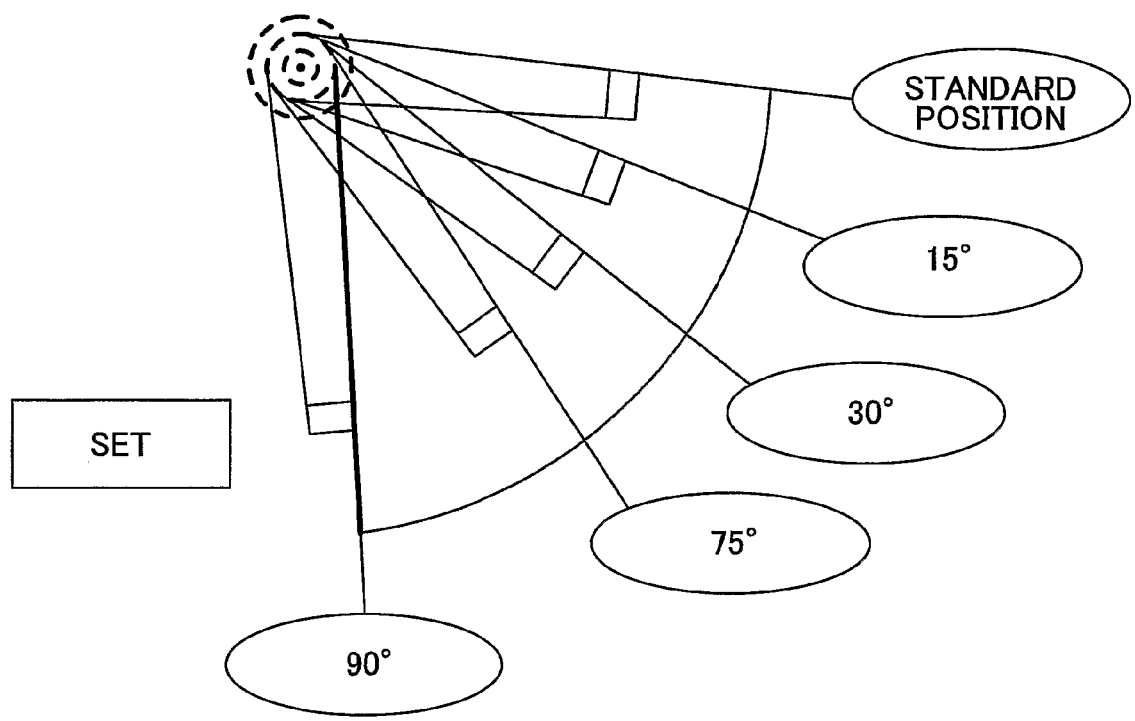
FIG. 17 is a view showing a preset picture of a tilt angle of the operations part of the embodiment of the present invention.
Figure 18:
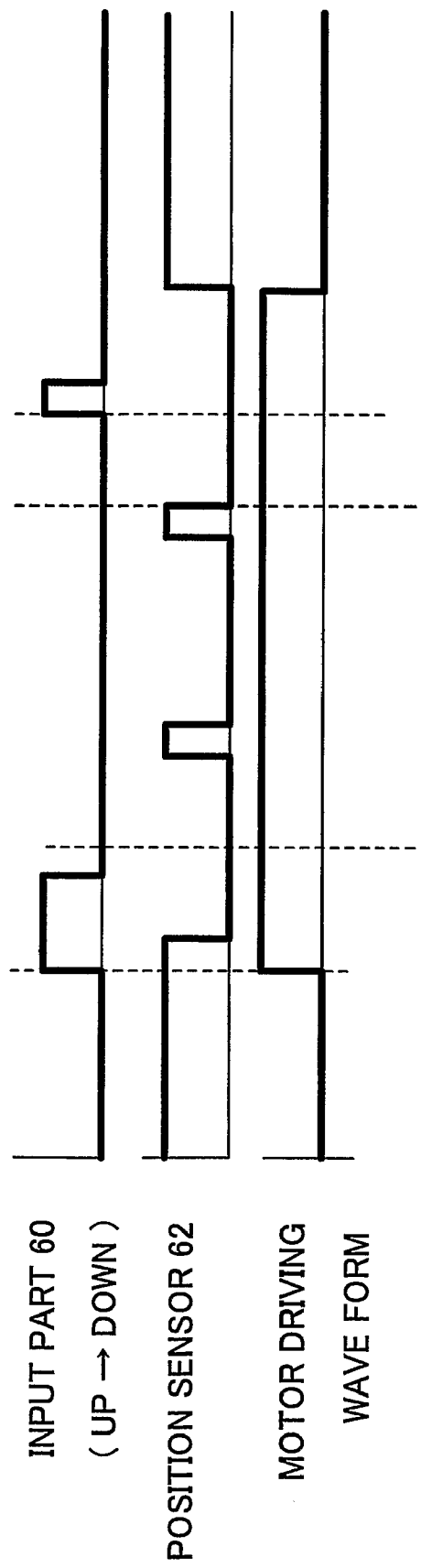
FIG. 18 is a timing chart of a control signal of the embodiment of the present invention.
Figure 19:
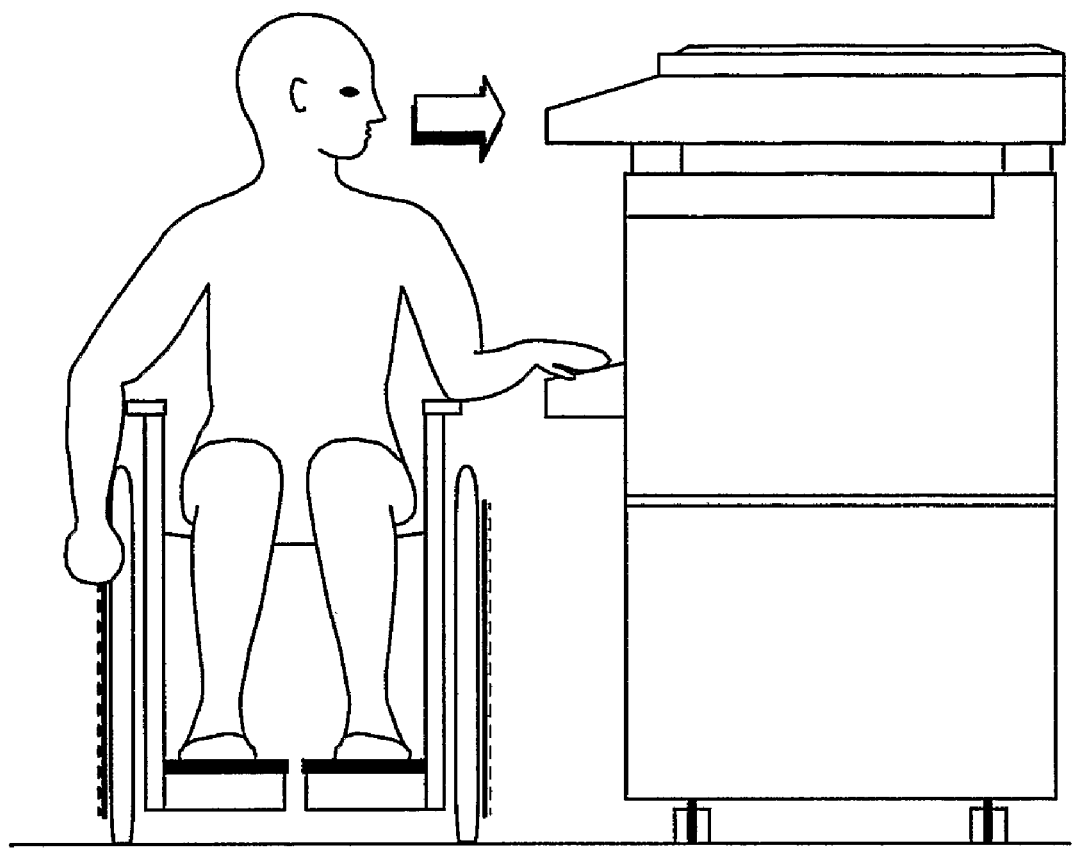
FIG. 19 is a view showing how the operations panel of the embodiment of the present invention can be seen from a wheelchair.

FIG. 18 is a timing chart of a control signal when a one-touch operation is performed until the operations part 4 reaches the stopping position that has been set in advance at the time when the operations part 4 is rotated. An input picture for presetting the stopping position is prepared, as shown in FIG. 17, and a tilt angle which can be selected is displayed. A touch panel is provided at the display device. By touching a position indicating the desirable position, the desirable angle is input. The value of the angle is stored by touching the SET button. The operations control part 16 causes the angle to be applied at the time of the tilt operation. Because of this, the stopping position of the operations part 4 is visually confirmed by the display device.

When the mechanism part is driven by the motor 30, foreign material may be in the mechanism part or the motor 30 at the time of rotation or the rotation shaft may be locked due to a heavy load based on an abnormality of the mechanism part. In this case, the electrical current to the motor 30 for rotating is increased and therefore the abnormality of the load can be detected by monitoring the electrical current value. The motor driving is stopped when the abnormality is detected so that damage to the machine or the danger can be avoided.

Next, the input part of the embodiment of the present invention is discussed. Generally, while input for the tilt operation is displayed in the vicinity of the input part, a situation may occur where the position of the operations panel 4 is too high for a wheel-chair user or a person of low height so that it is difficult for him/her to see the display in the vicinity of the input part. Because of this, it is preferable that the input be displayed at a side surface of the operations panel 4 as a position which can be easily seen. However, in a most downward position, the display of such a side surface cannot be seen but the display of the operations panel 4 upper surface can be seen. Under this structure, the input can be seen on the display of the side surface when the operations panel is positioned substantially horizontal or on the display of the upper surface when the operations panel is tilted most downward (vertical).

Next, a driving process of the operations panel 4 of the embodiment of the present invention is discussed with reference to FIG. 20. FIG. 20 is a flowchart showing the driving process of the embodiment of the present invention.

When there is request from the input part 60 (the tilt SW 35 shown in FIG. 3, for example) in step S1/YES, present stopping position information is obtained in step S7. Based on the information obtained in step S7, whether the present stopping position is within a designated angle (e.g., substantially horizontal) is determined in step S8.

If the present stopping position is within a designated angle in step 8/YES, the operations panel 4 is rotated in a direction opposite to the direction set in the input part 60 in step S9. If the present stopping position is not within the designated angle in step 8/NO, the operations panel 4 is rotated in the direction set in the input part 60 in step S10. The standard for determining whether the operations panel 4 is within the designated angle is different between the input part 60 and the input part 61. For example, a substantially horizontal angle may be standard or a substantially vertical angle may be standard.

When there is no request from the input part 60 in step S1/NO, whether there is a request from the input part 61 (the tilt SW 36 shown in FIG. 3, for example) is determined in step S2.

If there is a request from the input part 61 in step S2/YES, the present stopping position information is obtained in step S3. Based on the information obtained in step S3, whether the present stopping position is within a designated angle is determined in step S4.

If the present stopping position is within the designated angle in step 4/YES, the operations panel 4 is rotated in the direction opposite to the direction set in the input part 61 in step S5. If the present stopping position is not within the designated angle in step 4/NO, the operations panel 4 is rotated in the direction set in the input part 61 in step S6.

For example, when the operations panel 4 is vertical, the operations panel 4 is rotated in the reverse direction (step S9) by pushing a switch situated at the rear side of the operations panel 4 so that the operations panel is raised. In addition, when the operation panel 4 is substantially horizontal, the operations panel 4 is rotated in the reverse direction (step S5) by pushing a switch situated at the surface side of the operations panel 4 so that the operations panel is lowered.

According to the embodiment of the present invention, when the operations panel is in a specific angle such as substantially vertical or substantially horizontal, the rotation direction corresponding to the switch is set in reverse or the operation in a specific direction is performed by pushing any switch, so that operability can be improved.

Thus, the above-discussed embodiment of the present invention is achieved by a setting angle adjusting device, including: a first input part configured to input an instruction for changing a setting angle of an operations panel in a first direction; a second input part configured to input an instruction for changing the setting angle of the operations panel in a second direction different from the first direction; a rotation part configured to change the setting angle of the operations panel; and a driving part configured to rotate the rotation part in a designated direction as corresponding to either the first input part or the second input part.

The above-discussed embodiment of the present invention is also achieved by a setting angle adjusting device, including: a first input part configured to input an instruction for changing a setting angle of an operations panel in a first direction; a second input part configured to input an instruction for changing the setting angle of the operations panel in a second direction different from the first direction; a rotation part configured to change the setting angle of the operations panel; a driving part configured to rotate the rotation part in a designated direction; and a setting angle detection part configured to detect a plurality of operations panel stopping positions; wherein the driving part drives the rotation part in the direction corresponding to either the first or the second input part based on operation of either the first input part or the second input part, respectively, so that the driving part is stopped at a stopping position detected by the setting angle detection part.

If input to either the first input part or the second input part is performed at a plurality of times, the driving part may drive the rotation part in the direction corresponding to either the first or second input part, the setting angle detection part may measure the operations panel stopping position corresponding to the number of the inputs, and the driving part may be stopped at the stopping position detected by the setting angle detection part.

If the input to either the first input part or the second input part is performed at a plurality of times, the driving part may drive the rotation part in a range of the number not exceeding the stopping position in the rotational direction.

The setting angle adjusting device may further include a storing part configured to store the setting angle at which angle the driving part is stopped among a plurality of the setting angles of the operations panel detected by the setting angle detection part, wherein when input from either the first input part or the second input part is detected, the driving part may drives the rotation part, the setting angle stored in the storing part may be detected by the detection part; and the driving part may be stopped at the stopping position detected by the setting angle detection part.

The setting angle adjusting device may further include a stopping position display part configured to display the setting angle at which angle the operations panel can be stopped; and a stopping position input part configured to input the setting angle at which angle the operations panel can be stopped; wherein contents of input by the stopping position input part may be stored in the storing part.

The stop position display part and the stop position input part may be displayed on an operations panel picture and provided at a side surface of an operations panel front surface.

The first input part and the second input part may be pushing switches provided at upper and lower surfaces of the operations panel; and the operations panel may be rotated in a pushing direction of the pushing switch so that the setting angle is changed.

The setting angle adjusting device as claimed in claim may further include a standard position determination part configured to determine whether the setting angle of the operations panel is a maximum setting angle; wherein the standard position determination part may determine that the setting angle of the operations panel is the maximum setting angle when either the first input part or the second input part is operated; and the driving part may drive the rotation part in a directions different from a direction instructed by one of the first input part and the second input part when the rotation in the direction corresponding to the input directions of one of the first input part and the second input part cannot be performed.

The driving part may continue the operation even if there is no input operation when the input operation has been continuously performed by either the first input part or the second input part for a time longer than a designated time.

The operation of the driving part may be stopped when an input operation by either the first input part or the second input part is detected during a time when the driving part continues operations.

The setting angle adjusting device may further include a connection part configured to connect an output shaft of the driving part and a rotation shaft of the operations part via a speed reducing mechanism; and a brake part configured to brake the driving part at the time when the driving part is stopped.

The setting angle adjusting device may further include an overload detection part configured to detect an overload of the driving part; and a driving stopping part configured to stop the operation of the driving part when the overload detection part detects an overload.

The above-discussed embodiment of the present invention is also achieved by a setting angle adjusting method, including a first input step of inputting an instruction that a setting angle of an operations panel is changed in a first direction; a second input step of inputting an instruction that the setting angle is changed to a second direction different from the first direction; a rotation step of changing the setting angle of the operations panel; and a driving step of rotating the rotation part in a designated direction corresponding to one of the first input step and the second input step.

The above-discussed embodiment of the present invention is also achieved by a setting angle adjusting method, including a first input step of inputting an instruction that a setting angle of an operations panel is changed in a first direction; a second input step of inputting an instruction that the setting angle is changed to a second direction different from the first direction; a rotation step of changing the setting angle of the operations panel; a driving step of rotating the rotation part in a designated direction; and a setting angle detection step of detecting plural operation panel stopping positions; wherein the rotation part is driven in a direction corresponding to either the first or second input process based on operation of either the first input process or the second input process, respectively, so that the driving process is stopped at a stopping position detected in the detection process.

The setting angle adjusting method may further include a standard position determination process of determining whether the setting angle of the operations panel is a maximum setting angle; wherein it may be determined that the setting angle of the operations panel is the maximum setting angle in the standard position determination process when either the first input process or the second input process is performed; and in the driving process, the rotation part may be driven in a direction different from a direction instructed by one of the first input process and the second input process when the rotation in the direction corresponding to the input directions of the one of the first input process and the second input process cannot be performed.

The present invention is not limited to the above-discussed embodiments, but variations and modifications may be made without departing from the scope of the present invention.

This patent application is based on Japanese Priority Patent Application No. 2005-198034 filed on Jul. 6, 2005 and Japanese Priority Patent Application No. 2006-41526 filed on Feb. 17, 2006, the entire contents of which are hereby incorporated by reference.

The invention claimed is:

1. A setting angle adjusting device, comprising:
    a first input part configured to input an instruction for changing a setting angle of an operations panel in a first direction;
    a second input part configured to input an instruction for changing the setting angle of the operations panel in a second direction different from the first direction;
    a rotation part configured to change the setting angle of the operations panel; and
    a driving part configured to rotate the rotation part in a designated direction as corresponding to either the first input part or the second input part,
    wherein the first input part and the second input part are provided at upper and lower surfaces of the operations panel and the setting angle is changed by rotating the operations panel.

2. The setting angle adjusting device as claimed in claim 1, further comprising:
    a standard position determination part configured to determine whether the setting angle of the operations panel is a maximum setting angle,
    wherein the standard position determination part determines that the setting angle of the operations panel is the maximum setting angle responsive to input from either the first input part or the second input part; and
    the driving part drives the rotation part in a direction different from a direction instructed by one of the first input part and the second input part when the rotation in the direction corresponding to the input directions of one of the first input part and the second input part cannot be performed.

3. The setting angle adjusting device as claimed in claim 1, wherein the driving part continues the rotation of the rotation part even if there is no additional instruction input by either the first or second input parts when the input operation has been continuously performed by either the first input part or the second input part for a time longer than a designated time.

4. The setting angle adjusting device as claimed in claim 3, wherein the driving part stops the rotation of the rotation part responsive to a detection of an additional instruction input by either the first input part or the second input part.

5. The setting angle adjusting device as claimed in claim 1, further comprising:
    a connection part configured to connect an output shaft of the driving part and a rotation shaft of the operations part by a speed reducing mechanism; and
    a brake part configured to brake the driving part at the time when the driving part is stopped.

6. The setting angle adjusting device as claimed in claim 1, further comprising:
    an overload detection part configured to detect an overload of the driving part; and
    a driving stopping part configured to stop the operation of the driving part when the overload detection part detects an overload.

7. A setting angle adjusting device, comprising:
    a first input part configured to input an instruction for changing a setting angle of an operations panel in a first direction when manually activated by a user;
    a second input part configured to input an instruction for changing the setting angle of the operations panel in a second direction when manually activated by a user, the second direction being different from the first direction;
    a rotation part configured to change the setting angle of the operations panel;
    a driving part configured to rotate the rotation part in a designated direction; and
    a setting angle detection part configured to detect a plurality of operations panel stopping positions,
    wherein the driving part drives the rotation part in the direction corresponding to instructions to rotate from either the first or the second input part based on operation of either the first input part or the second input part, respectively, so that the driving part is stopped at a stopping position detected by the setting angle detection part.

8. The setting angle adjusting device as claimed in claim 7, wherein if input to either the first input part or the second input part is performed at a plurality of times, the driving part drives the rotation part in the direction corresponding to either the first or second input part, the setting angle detection part measures the operations panel stopping position corresponding to the number of the inputs, and the driving part is stopped at the stopping position detected by the setting angle detection part.

9. The setting angle adjusting device as claimed in claim 7, further comprising:
    a storing part configured to store the setting angle at which angle the driving part is stopped among a plurality of the setting angles of the operations panel detected by the setting angle detection part,
    wherein when input from either the first input part or the second input part is detected, the driving part drives the rotation part, the setting angle stored in the storing part is detected by the detection part, and the driving part is stopped at the stopping position detected by the setting angle detection part.

10. The setting angle adjusting device as claimed in claim 7, further comprising:
a stopping position display part configured to display the setting angle at which angle the operations panel can be stopped; and
a stopping position input part configured to input the setting angle at which angle the operations panel can be stopped,
wherein contents of input by the stopping position input part are stored in the storing part.

11. The setting angle adjusting device as claimed in claim 10,
wherein the stop position display part and the stop position input part are displayed on an operations panel picture and provided at a side surface of an operations panel front surface.

12. The setting angle adjusting device as claimed in claim 9,
wherein the first input part and the second input part include pushing switches provided at upper and lower surfaces of the operations panel; and
the operations panel is rotated in a pushing direction of the pushing switches so that the setting angle is changed.

13. The setting angle adjusting device as claimed in claim 9, further comprising:
a standard position determination part configured to determine whether the setting angle of the operations panel is a maximum setting angle,
wherein the standard position determination part determines that the setting angle of the operations panel is the maximum setting angle when either the first input part or the second input part is operated; and
the driving part drives the rotation part in a direction different from a direction instructed by one of the first input part and the second input part when the rotation in the direction corresponding to the input directions of one of the first input part and the second input part cannot be performed.

14. The setting angle adjusting device as claimed in claim 9,
wherein the driving part continues the rotation of the rotation part even if there is no additional instruction input from either the first or second input parts when the input operation has been continuously performed by either the first input part or the second input part for a time longer than a designated time.

15. The setting angle adjusting device as claimed in claim 14,
wherein the driving part stops the rotation of the rotation part responsive to a detection of an additional instruction input by either the first input part or the second input part.

16. The setting angle adjusting device as claimed in claim 9, further comprising:
a connection part configured to connect an output shaft of the driving part and a rotation shaft of the operations part via a speed reducing mechanism; and
a brake part configured to brake the driving part at the time when the driving part is stopped.

17. The setting angle adjusting device as claimed in claim 9, further comprising:
an overload detection part configured to detect an overload of the driving part; and
a driving stopping part configured to stop the operation of the driving part when the overload detection part detects an overload.

* * * * *